(12) United States Patent
Williams et al.

(10) Patent No.: US 10,647,243 B2
(45) Date of Patent: May 12, 2020

(54) UNDER-FLOOR TRUCK DECK TIE-DOWN DEVICE AND TRUCK DECK AND TRUCK HAVING THE SAME

(71) Applicant: Toyota Motor Engineering & Manufacturing North America, Inc., Erlanger, KY (US)

(72) Inventors: Paxton S. Williams, Milan, MI (US); Scott L. Frederick, Brighton, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 81 days.

(21) Appl. No.: 15/874,996

(22) Filed: Jan. 19, 2018

(65) Prior Publication Data
US 2019/0225137 A1    Jul. 25, 2019

(51) Int. Cl.
*B60P 7/08* (2006.01)
*B62D 33/027* (2006.01)

(52) U.S. Cl.
CPC ........... *B60P 7/0838* (2013.01); *B60P 7/0807* (2013.01); *B62D 33/0273* (2013.01)

(58) Field of Classification Search
CPC ....... B60P 7/083; B60P 7/0807; B60P 7/0823; B60P 7/0846; B60P 7/0853; B60P 3/40; B60P 7/0876; B25D 17/02
USPC ..... 410/103, 100, 106, 110, 112, 32, 3, 101, 410/97; 224/497, 498, 539, 544, 549, 224/403, 446
See application file for complete search history.

(56) References Cited

U.S. PATENT DOCUMENTS

| 4,842,458 A | * | 6/1989 | Carpenter | B60P 7/083 242/379.2 |
| 5,338,136 A | | 8/1994 | Hetchler | |
| 5,673,956 A | | 10/1997 | Emery | |
| 5,961,263 A | * | 10/1999 | Nunez | B60P 7/0846 410/100 |
| 6,290,440 B1 | | 9/2001 | DiViccaro | |
| 6,464,437 B1 | * | 10/2002 | Elwell | B60P 7/0807 410/106 |
| 6,742,972 B2 | * | 6/2004 | Brunet | B60P 7/083 410/100 |
| 6,929,438 B1 | * | 8/2005 | Foster | B60P 7/083 410/100 |

(Continued)

*Primary Examiner* — D Glenn Dayoan
*Assistant Examiner* — Sunsurraye Westbrook
(74) *Attorney, Agent, or Firm* — Christopher G. Darrow; Darrow Mustafa PC

(57) ABSTRACT

A truck deck includes a floor that defines a cargo area on a top surface. The deck also includes a pocket disposed in the floor. The pocket defines a space disposed below the floor and a pocket opening. The deck further includes a selectively openable and closable pocket cover movable between an open position and a closed position. The pocket cover is disposed to cover the pocket in the closed position. The deck also includes a tie-down device disposed in the pocket. The tie-down device includes an attachment device, an adjustment device, and an elongated strap having an attachment end that is attached to the attachment device configured for attachment to a cargo, and an adjustment end that is attached to the adjustment device. The tie-down device is configured to adjust the length of the strap and apply a downward tensioning force to the cargo.

20 Claims, 5 Drawing Sheets

(56) References Cited

U.S. PATENT DOCUMENTS

| | | | |
|---|---|---|---|
| 7,090,449 B1 * | 8/2006 | Hugg | B60P 7/0807 |
| | | | 410/102 |
| 7,431,548 B2 * | 10/2008 | Acton | B60P 7/0807 |
| | | | 410/103 |
| 8,182,182 B2 | 5/2012 | Tardif et al. | |
| 8,376,674 B1 | 2/2013 | Davis, III | |
| 8,393,666 B1 | 3/2013 | Rhoton et al. | |
| 2004/0056058 A1 | 3/2004 | Ryan | |
| 2007/0257501 A1 | 11/2007 | Smith et al. | |
| 2008/0173684 A1 | 7/2008 | Kyasky | |
| 2011/0243681 A1 | 10/2011 | Griffith | |
| 2012/0263552 A1 | 10/2012 | Hooton | |
| 2017/0113595 A1 | 4/2017 | Hemphill | |

\* cited by examiner

UNDER-FLOOR TRUCK DECK TIE-DOWN DEVICE AND TRUCK DECK AND TRUCK HAVING THE SAME

FIELD OF THE INVENTION

The embodiments disclosed herein relate generally to a truck deck tie-down device and, more particularly, to an apparatus that includes an under-floor truck deck tie-down device, as well as a truck deck and/or truck having the same.

BACKGROUND

Light duty trucks known as pickup trucks that include a passenger compartment and a rear compartment that includes a cargo area within a deck are widely used both by consumers and by businesses in a multitude of consumer and commercial applications because of their versatility to provide simultaneous transportation of passengers in the passenger compartment and transportation of a cargo in the rear compartment. The cargo transported can include all manner of materials, equipment, tools and the like, including various combinations of these items.

The movement of the vehicle while transporting the cargo and the actuation of the vehicle suspension result in complex horizontal and vertical dynamic forces acting on the cargo that can cause it to shift, slide, tip, or otherwise change position within the cargo area.

Various apparatuses and methods have been employed to secure cargo within the cargo area, but these generally have been unable to produce a consistent significant downward or clamping force sufficient to secure the cargo to the floor of the deck and prevent its movement as described herein.

Therefore, it is very desirable to provide a device that is configured to tie-down and secure the cargo to the deck of the rear compartment of a truck, as well as to provide a rear compartment and/or truck that incorporates such a device.

SUMMARY OF THE INVENTION

In one embodiment, a truck deck is disclosed. The truck deck includes a floor that defines a cargo area on a top surface. The deck also includes a pocket disposed in the floor. The pocket defines a space disposed below the top surface of the floor and a pocket opening. The deck further includes a selectively openable and closable pocket cover movable between an open position and a closed position. The pocket cover is disposed to cover the pocket in the closed position. The deck also includes a tie-down device disposed in the pocket. The tie-down device includes an attachment device, an adjustment device, and an elongated strap. The elongated strap has an attachment end that is attached to the attachment device and configured for attachment to a cargo, and an adjustment end that is attached to the adjustment device. The tie-down device is configured to adjust the length of the strap and apply a downward tensioning force to the cargo.

In another embodiment, a tie-down device assembly for the deck of a pickup truck is disclosed. The tie-down device assembly for the deck of a pickup truck includes a pocket configured for disposition in the floor of a pickup truck deck. The pocket defines a space disposed below the floor and a pocket opening. The tie-down device assembly also includes a selectively openable and closable pocket cover movable between an open position and a closed position. The pocket cover is disposed to cover the pocket in the closed position. The tie-down device assembly further includes a tie-down device disposed in the pocket. The tie-down device includes an attachment device, an adjustment device, and an elongated strap having an attachment end that is attached to the attachment device and configured for attachment to a cargo, and an adjustment end that is attached to the adjustment device. The tie-down device is configured to adjust the length of the strap and apply a downward tensioning force to the cargo.

In yet another embodiment, a truck is disclosed. The truck includes an enclosed passenger compartment and a rear compartment comprising a deck. The deck includes a floor that defines a cargo area on a top surface. The deck also includes a pocket disposed in the floor. The pocket defines a space disposed below the floor and a pocket opening. The deck further includes a selectively openable and closable pocket cover movable between an open position and a closed position. The pocket cover is disposed to cover the pocket in the closed position. The deck also further includes a tie-down device disposed in the pocket. The tie-down device includes an attachment device, an adjustment device, and an elongated strap having an attachment end that is attached to the attachment device and configured for attachment to a cargo, and an adjustment end that is attached to the adjustment device. The tie-down device is configured to adjust the length of the strap and apply a downward tensioning force to the cargo.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
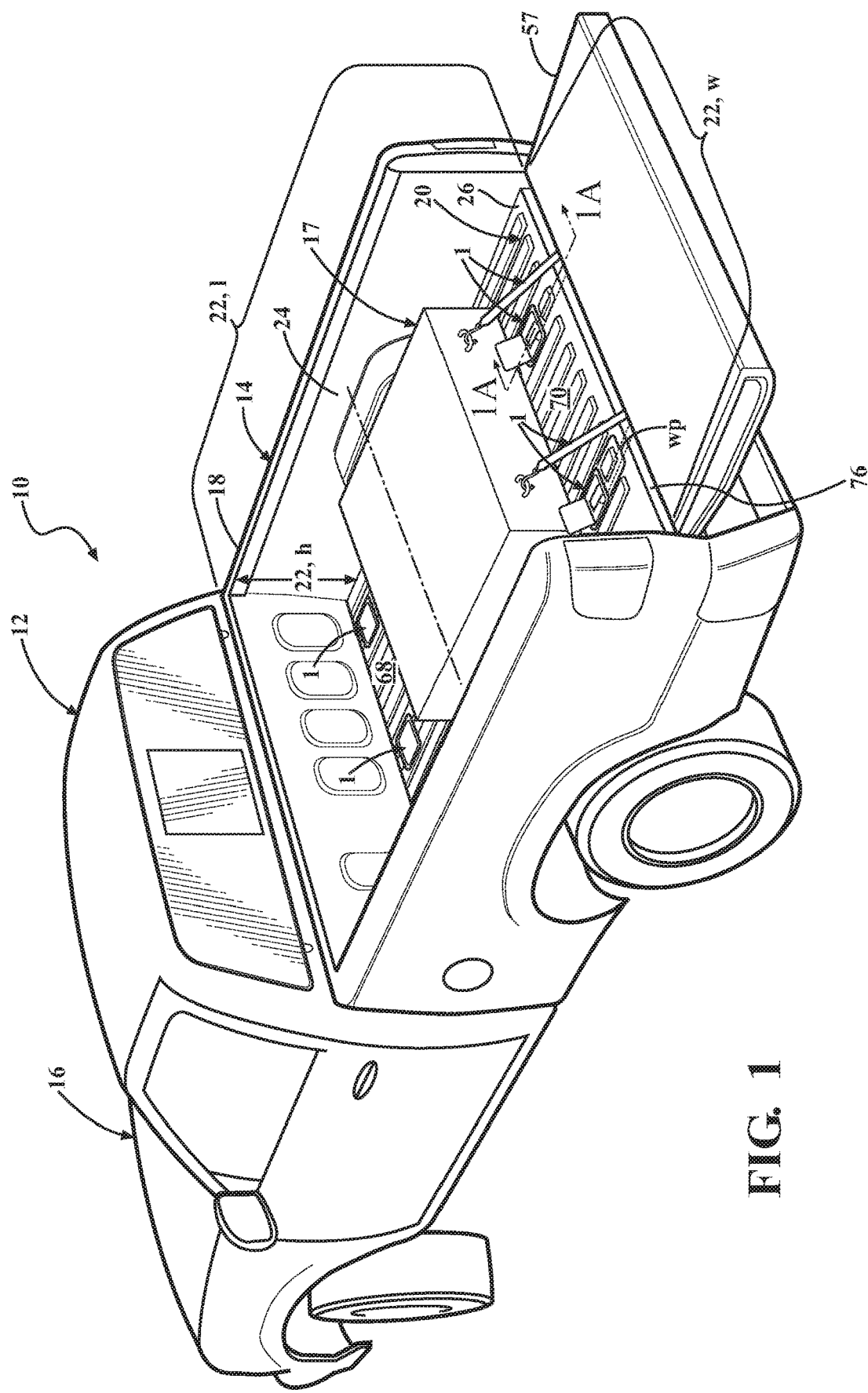
FIG. 1 is a perspective view of an exemplary embodiment of a tie-down device assembly for the deck of a pickup truck, and a pickup truck deck and pickup truck embodying the same with the tie-down device in a deployed condition with regard to a cargo.

An under-floor truck deck tie-down device assembly is disclosed, as well as a truck rear compartment that includes a truck deck and/or a truck that incorporate the tie-down device assembly. The tie-down device assembly is applicable to all manner of trucks, including light-duty (e.g. US Gross Vehicle Weight Rating (GVWR) Classes 1-3), medium-duty (e.g. US GVWR Classes 4-6), and heavy-duty (e.g. US GVWR Classes 7-9) trucks that have a passenger compartment and a rear compartment comprising a deck that defines a cargo area. Suitable truck types include box, cab forward, chassis cab, flatbed, logging, platform, tractor/ trailer, and tow trucks, vans, conversion vans, panel vans, and sport utility vehicles. In one embodiment, the truck includes light duty trucks known as pickup trucks that have an enclosed passenger compartment and a rear compartment comprising an open cargo area with a deck having a floor and relatively low sides and a tailgate. The under-floor truck deck tie-down device assembly includes a pocket configured for disposition in the floor of a pickup truck deck. The pocket defines a space disposed below the floor and a pocket opening. The tie-down device assembly also includes a selectively openable and closable pocket cover movable between an open position and a closed position. In the open position, the raised pocket cover exposes the pocket and remainder of the tie-down device assembly for access and use by a user, such as a vehicle operator. The pocket cover is disposed to cover the pocket and the remainder of the tie-down device assembly in the closed position. The tie-down device assembly further includes a tie-down device disposed in the pocket. The tie-down device includes an attachment device, an adjustment device, and an elongated strap having an attachment end that is attached to the attachment device and configured for attachment to a cargo, and an adjustment end that is attached to the adjustment device. The tie-down device is configured to adjust the length of the strap and apply a downward tensioning force to the cargo.

The under-floor truck deck tie-down device assembly, or a plurality of under-floor truck deck tie-down device assemblies, may be supplied and incorporated into all manner of truck decks and in all makes and models of pickup trucks as OEM original equipment. Alternately, the under-floor truck deck tie-down device assembly or assemblies may be provided on a stand-alone basis for sale and incorporation into all manner of truck decks and in all makes and models of pickup trucks through the automotive aftermarket. In one embodiment, a truck deck may incorporate a plurality of under-floor truck deck tie-down device assemblies comprising a plurality of pockets and a corresponding plurality of pocket covers and tie-down devices. A plurality of under-floor truck deck tie-down device assemblies may be disposed in a spaced apart pattern within the floor of the truck deck and may be included in any part of the floor, including a front portion (e.g. forward of the truck's wheel wells) or a rear portion (e.g. rearward of the truck's wheel wells), or in both front and rear portions. In one embodiment, the pocket includes a pocket opening that opens proximate a bottom surface of the floor and the attachment device and strap are disposed under the floor and are extendable toward a rear end of the deck using the adjustment device. In one embodiment, the attachment device and strap extend and are attached to an attachment point disposed on a lower surface of the floor in a stored or stowed condition or position. In one embodiment, the under-floor truck deck tie-down device assembly (or assemblies), including the attachment device and strap, are further extendable around the rear end of the deck upwardly to define a partially deployed condition or position from which they may be attached to a cargo attachment located on a cargo where they are configured to be tightened and tensioned to exert a predetermined downward force on the cargo and define a deployed condition or position. Any suitable attachment device may be used, including a loop in the strap, circular ring, D-ring, carabiner, link, threaded quick link, clevis, coupling, hook, J-hook, or S-hook, or a combination thereof. Further, any suitable adjustment device may be used, including all manner of selectively releasable and engageable strap ratchet devices.

The under-floor truck deck tie-down device assembly is advantageously configured to provide a downward directed force to a cargo, thereby securing the cargo during transportation and preventing, or reducing the tendency for, movement or shifting of the cargo while the vehicle is being operated during transportation of the cargo. This advantageously prevents, or reduces the probability or tendency for shifting of the cargo in the vehicle during transportation. This also advantageously improves vehicle performance, such as by maintaining a predetermined balanced load distribution upon the vehicle suspension. Preventing or reducing the opportunity for the shifting of cargo during transportation is also very advantageous because the cargo is often loaded into the deck of the truck using mechanical assistance (e.g. various fork lifts and other specialized loading equipment) that is generally not available to a vehicle operator if the cargo moves or shifts in transit and thus cannot be corrected by the operator.

The under-floor truck deck tie-down device assembly or assemblies can also advantageously be placed in locations (e.g. in the rear portion of the deck) and the cargo may be placed in relation to the tie-down device assembly or assemblies so that the downward component of the tensioning force is maximized, or so that a predetermined downward directed force component may be achieved.

The under-floor truck deck tie-down device assembly is a significant improvement, for example, over the use of stand-alone tie-down devices (e.g. discrete ratchet straps) that are configured to attach to existing vehicle structures, such as the sidewalls of the deck or the rear bumper or frame components for several reasons. First, the under-floor truck deck tie-down device assembly is attached to the truck so it is always available for use, as opposed to discrete stand-alone devices which are not always in the truck and available for use. Second, in addition to the above, attachment to the sidewalls of the deck or the rear bumper or frame components provides a very limited range of downward directed force components that have a range of values and a maximum value that is less than those achievable with the under-floor truck deck tie-down device assembly. Third, the use of such devices often results in placement of the ratchet mechanism against a portion of the vehicle which can result in the undesirable scratching or marring of the surface of the vehicle, including painted surfaces. Fourth, the tie-down device, such as a ratchet mechanism is conveniently disposed under the floor in a protective pocket and is covered by a cover in both the stowed or stored condition as well as the deployed condition so that the device is protected from elements of the external environment, including dust, dirt, road spray that may include salt or other corrosive materials, water, ice, snow and the like. Fifth, the under-floor truck deck tie-down device assembly can be utilized in trucks where the rear compartment is covered by a tonneau cover or a truck top or topper, whereas the use of discrete tie-down is frequently limited by the use of tonneau covers or a truck top or topper because they limit access to the structural stake channels that are found in trucks and frequently used in conjunction with discrete tie-down devices.

As used herein, the terms front or forward or rear or rearward refer to the front or rear of the truck, or to a direction toward the front or rear of the truck, respectively. The term longitudinal or along the length refers to a direction that extends along a vehicle centerline between the front and the rear. The term lateral or along the width refers to a direction that is orthogonal, or substantially orthogonal, to the longitudinal direction. The terms up or upward or down or downward refer to the top or bottom of the truck, or to a direction toward the top or bottom of the truck, respectively. As used herein, references to an item being disposed, located or positioned "under-floor" means below the top surface of the referenced floor, or a portion of the top surface of a referenced floor, such as, for example, a plane defined by the portions of the top surface of the floor associated with the tops of a plurality of longitudinally protruding ribs as are commonly used in pickup truck floors. Alternately, the term "in-floor" may also be used herein with regard to items being disposed, located or positioned within the floor below the top surface of the referenced floor, or a portion of the top surface of a referenced floor.

Referring now to the figures, particularly FIGS. 1-4, an embodiment of a truck 10 is disclosed, more particularly, a light duty pickup truck that includes an under-floor truck deck tie-down device assembly 1. The truck 10 includes all manner of trucks, including all makes and models, of pickup trucks, and including those commonly referred to as small, mid, and full-size pickup trucks, such as, for example, trucks generally referred to as half, three quarter, and one-ton pickup trucks. The truck 10 includes an enclosed passenger compartment 12 configured to receive the driver and/or passengers. The truck 10 also includes an enclosed engine compartment 16 forward of the passenger compartment 12 that is configured to house the vehicle powertrain including an internal combustion engine, electric machine, or hybrid or combination thereof, a transmission, and other vehicle systems and components as are well-known in the art. The truck 10 also includes a rear compartment 14, including a substantially open or open rear compartment, also referred to as a box, that is configured to receive and transport all manner of cargo.

Figure 1A:
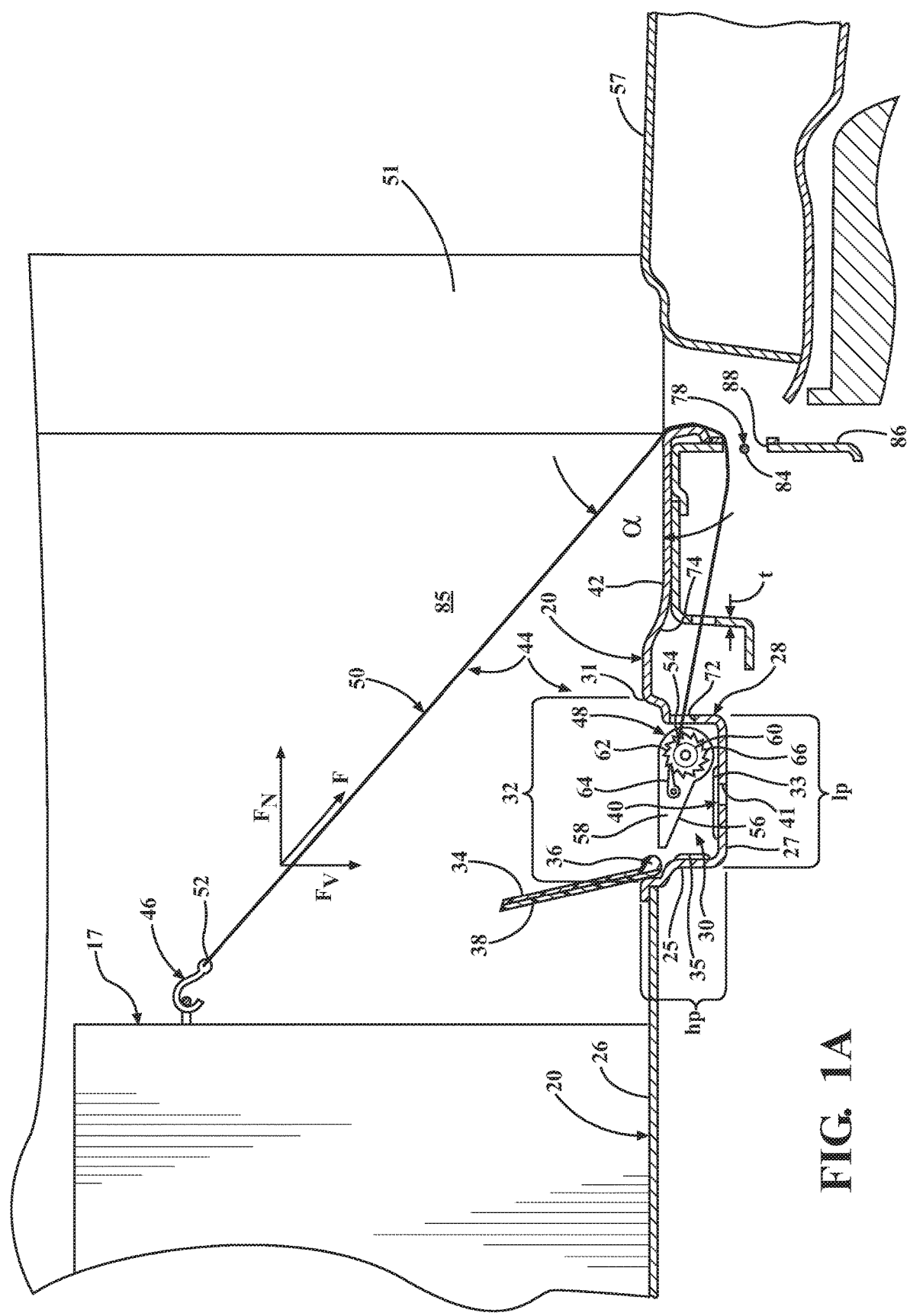
FIG. 1A is a cross-sectional view of Section 1A-1A of FIG. 1.

Referring to FIGS. 1-4, and particularly FIGS. 1 and 1A, in one embodiment, the under-floor truck deck tie-down device assembly 1 includes the rear compartment 14. The rear compartment 14 includes a deck 18 that is configured to receive the cargo 17. The deck 18 includes a floor 20 that defines a cargo area 22. Any suitable floor 20 may be used. The floor 20 may be formed as a unitary piece, or as plurality of pieces that are joined to one another as shown in FIG. 1A, and may include multiple layers or plies of material through its thickness that are positioned proximate one another and joined together in any manner, such as, for example, in a form of uni-body construction. The floor 20, and thus the deck 18 and the cargo area 22, have a length (l) and width (w) as shown in FIG. 1. The length (l) and width (w) may be any suitable length and width, including in various embodiments lengths ranging from about 147 to 259 cm, and widths ranging from about 129 to 183 cm. The deck 18 also includes a pair of opposed inner sidewalls 24 that define the cargo area 22. The inner sidewalls 24 extend longitudinally along the length (l) of the cargo area 22. The inner sidewalls 24, and thus the deck 18 and the cargo area 22, have a height (h) that extends vertically from the top surface 26 of the floor 20 to the top surface of the deck 18. The height (h) may be any suitable height, including in various embodiments heights ranging from about 45 to 67 cm. The deck 18, including the floor 20 and inner sidewalls 24, may be made from any suitable material, including any suitable metal, engineering plastic, or combination or composite thereof. Suitable metals include sheet forms of various steel and aluminum alloys. Suitable engineering plastics include various engineering thermoplastic or thermoset polymer compositions, or combinations or composites thereof, and particularly may comprise various sheet molding compound (SMC) compositions which are ready to mold glass-fiber reinforced polymer resin (e.g. polyester) composite materials primarily used in compression molding or forming operations. In one embodiment, an SMC comprises a plurality of long strands (e.g. >2.54 cm) of a chopped fiber (e.g. glass fibers or carbon fibers) dispersed in a polymer resin of an engineering plastic (e.g. a polyester, vinyl ester or epoxy resin), which may include a thermoplastic or thermoset resin, or a combination or copolymer thereof.

Referring again to FIGS. 1 and 1A, in one embodiment, the deck 18 includes the under-floor truck deck tie-down device assembly 1. The floor 20 defines the cargo area 22 on a top surface 26. A pocket 28 is disposed in the floor 20. The pocket 28 comprises a recess in, or a recessed portion of, the floor 20 and the pocket 28 is disposed below the top surface 26 of the floor 20. In one embodiment, the pocket 28 may be integrally formed as a portion of a section of the floor 20 as shown in FIG. 1A. The pocket 28 may have any suitable size and shape, including various circular, semicircular, or rectangular cross-sectional shapes. In the embodiment of FIGS. 1 and 1A, the pocket 28 has a generally rectangular or rounded rectangular cross-sectional shape having a length ($l_p$) and width ($w_p$), as well as a height ($h_p$). The length ($l_p$), width ($w_p$), and height ($h_p$) define a shape and size of the pocket 28. In one embodiment, the pocket 28 has a generally rectangular or rounded rectangular cross-sectional shape, with a length ($l_p$), width ($w_p$), and height ($h_p$) that each range from 7 to 21 cm, more particularly 10 to 16 cm. The pocket 28 defines a space 30 or volume disposed below the top surface 26 of the floor 20 as well as a pocket opening 32. The pocket opening 32 is defined by the periphery of the pocket 28 and located at the open end 31 thereof. The pocket opening 32 may have any suitable size and shape, including a size and shape that is the same as the cross-sectional size and shape of the pocket 28, or that is different than the size and shape of the pocket 28, as well as a size and shape that provides a nesting arrangement with a selectively openable and closable pocket cover 34 such that the pocket cover 34 engages, nests within, and encloses the pocket opening 32, either completely or partially. The pocket 28 may have any suitable pocket wall thickness (t), including in one embodiment about 2 to 13 mm. In one embodiment, the thickness (t) is selected to enable the pocket 28 to bear the loads that result from application of a predetermined force (F) without flexure of sidewalls 25 or a base 27 of the pocket 28. In one embodiment, the pocket 28 and sidewalls 25 or base 27, or both, may incorporate one or more longitudinally-extending 33 or laterally-extending 35 reinforcing ribs to stiffen the pocket 28 and to enable the pocket 28 to bear the loads that result from application of the predetermined force (F) without flexure of the sidewalls 25 or base 27 of the pocket 28. In one embodiment, the longitudinally-extending 33 or laterally-extending 35 reinforcing ribs are analogous to those shown in the floor 20 in FIG. 1, albeit scaled in size and spacing concomitant with the size of the pocket 28 features.

As noted above, the pocket cover 34 is selectively openable and closable. The pocket cover 34 is movable by a vehicle operator or other user (not shown) between an open position shown in FIG. 1A and a closed position shown in FIG. 2. In the open position, the raised pocket cover 34 exposes the pocket 28 and remainder of the tie-down device assembly 1 for access and use by a user, such as a vehicle operator. The pocket cover 34 is disposed to cover the pocket 28 in the closed position. As used herein, cover includes configurations of the pocket cover 34 that completely cover or enclose the pocket 28, as well as configurations of the pocket cover 34 that partially enclose the pocket 28. In the embodiment shown in FIGS. 1A-4, the pocket cover 34 is pivotally movable about a hinge 36 that pivotably attaches the cover 34 to the pocket 28. Other moveable pocket covers 34 may be used including covers that are completely removable, as well as arrangements where the pocket cover 34 is partially removable and attached to the pocket 28, or the floor 20, such as by a tether or other attachment device that allows removal of the cover from the opening but also retains the cover, including a strap, cord, or other flexible tether configuration. The pocket cover 34, or pocket 28, or both, may optionally also include a seal 38 around their periphery that seals the space 30 and prevents, or greatly reduces or limits, the ingress of elements of the external environment, including dust, dirt, stones, insects, road spray that may include salt or other corrosive materials, water, ice, snow and the like. Whether or not the seal 38 is included, the pocket cover 34 limits the ingress of at least some elements of the external environment. The pocket 28 may also optionally include a drain 40 that allows and enables egress of certain elements of the external environment (e.g. dirt, water) if they gain ingress into the pocket 28. The drain 40 may have any suitable size or shape, which in one embodiment may include a hole or bore or slot 41. The drain 40 may be located in the sidewall 25 or the base 27 or both. The pocket 28 may be formed integrally with the deck 18 or floor 20, or with a portion 42 (or portions) or segment (or segments) thereof, which may include aftermarket floor portions 42 including pockets 28 that are added to the existing OEM deck floor 20 by forming a suitable opening in the floor 20 and fixing the floor portion 42 and the pocket 28 over or within the opening, or by replacing an existing portion of the floor 20, for example.

The under-floor truck deck tie-down device assembly 1 also includes a tie-down device 44 disposed in the pocket 28. In one embodiment, the tie-down device 44 may be disposed by attaching it to the pocket 28 using any suitable attachment, including a fastener, or fasteners, such as a threaded bolt, threaded bolt and nut, screw, or other fastener, or various types of weldments. The tie-down device 44 includes an attachment device 46, an adjustment device 48, and an elongated strap 50 having an attachment end 52 that is attached to the attachment device 46 configured for attachment to the cargo 17 and an adjustment end 54 that is attached to the adjustment device 46 and configured to extend or retract the strap 50. The tie-down device 44 is configured to adjust the length of the strap 50, such as by release and extension of the strap 50 or by retraction and collection of the strap 50 around or within the tie-down device 44 to apply the predetermined downward tensioning force (F) to the cargo 17. The downward force (F) comprises a normal or horizontal force component ($F_N$) and a vertical force component ($F_V$). The under-floor truck deck tie-down device assembly 1 together with placement of the cargo 17 advantageously enables development and maximization of the vertical force component ($F_V$), including embodiments where the vertical force component ($F_V$) is greater than the normal force component ($F_N$), and including embodiments where the downward force (F) is comprised entirely of a vertical force component ($F_V$). This generally occurs over a range of angles (α) of from 45 to 135 degrees. It should be noted that the under-floor truck deck tie-down device assembly 1 can be used to apply the predetermined downward force (F) where a portion of the cargo 17 extends onto and over a tailgate 57 when it is in a lowered position (e.g. FIGS. 1A and 4). The tailgate 57 is selectively openable and closable to fill opening 55 in the rear of deck 18 and enclose the cargo area 22, which may be lowered (opened) to load cargo 17 and then raised (closed) to enclose the cargo area 22. In one embodiment, the vertical force component ($F_V$) may comprise 25 to 500 newtons, more particularly 45 to 350 newtons, and even more particularly 90 to 300 newtons.

The tie-down device 44 may include any suitable attachment device 46, adjustment device 48, and elongated strap 50. In various embodiments, suitable attachment devices 46 include a loop in the strap 50 (e.g. a loop formed by bending the strap 50 onto itself and joining a free end to another portion of the strap 50 by sewing or welding), circular ring, D-ring, carabiner, link, threaded quick link, clevis, coupling, hook (FIGS. 1-4), J-hook (FIGS. 1-4), or S-hook, or a combination thereof. The circular ring, D-ring, carabiner, link, threaded quick link, clevis, coupling, or hook, or a combination thereof, may be formed from any suitable material, including a metal, plastic, ceramic, or a combination or composite thereof. Suitable metals include various cast iron, steel, aluminum, or titanium alloys.

In various embodiments, the elongated strap 50 may include any suitable size, shape, length, and strap material. In one embodiment, the strap 50 may comprise a strap material comprising a metal, plastic, glass fiber, carbon fiber, polymer fiber, mineral fiber, ceramic fiber, or synthetic or natural elastomer, or a combination or composite thereof. In one embodiment, the strap 50 comprises an engineering plastic, such as, for example, polyester, nylon or polypropylene, in any suitable form, including as a sheet or cloth or webbing, particularly a woven cloth or webbing. In one embodiment, the strap 50 comprises a reinforced elastomer, such as a fiber reinforced natural or synthetic rubber. The strap 50 will have a tensile strength sufficient to elastically bear the downward force (F), including elastically bearing the downward force without any plastic deformation.

Any suitable adjustment device 48 may be utilized, including all manner of mechanical, electrical, or electromechanical devices, and including those that employ electric motors to extend or release or retract a strap. In one embodiment, the adjustment device 48 includes a selectively releasable and engageable strap ratchet device 56. In one embodiment, the strap ratchet device 56 includes a rotatable ratchet handle 58, and a spindle 60 rotatably disposed within the handle 58 that is attached to the adjustment end 54 of the strap 50 and to a selectively engageable and releasable ratchet mechanism 62. The strap ratchet device 56 is configured to selectively tension the strap 50 and apply the predetermined force (F) by collection of the strap 50 as it wraps around the spindle 60 in one direction by action of the engaged (e.g. where a pawl 64 engages a ratchet gear 66, see FIG. 1A) ratchet mechanism 62 upon back and forth rotation of the handle 58, and to selectively release the tension of the strap 50 by release of the ratchet mechanism 62 and spindle 60 (e.g. where the pawl 64 is disengaged from the ratchet gear 66, see FIG. 4).

In one embodiment, as shown in FIG. 1, the deck 18 comprises a plurality of pockets 28 and a corresponding plurality of pocket covers 34 and tie-down devices 44. Any suitable number of pockets 28, pocket covers 34, and tie-down devices 44 may be included. In one embodiment, 2-12 pockets 28, pocket covers 34, and tie-down devices 44 may be included. A plurality of pockets 28, pocket covers 34, and tie-down devices 44 may be disposed in a spaced apart pattern within the floor 20, as illustrated generally in FIG. 1. Any suitable pattern of pockets 28 may be included, including spaced apart rows, columns, or both, along the length (l) and/or width (w) of the deck 18, and including patterns that are symmetric or asymmetric about a point, or along a longitudinal or lateral axis. In one embodiment, as shown in FIG. 1, the floor 20 comprises a front portion 68 and a rear portion 70, and the plurality of pockets 28 is disposed in the front portion and the rear portion. In another embodiment, the plurality of pockets 28 is disposed only in the rear portion 70.

In one embodiment, as shown in FIG. 1A, for example, the pocket 28, or pockets 28, include an opening 72 through the pocket 28, such as a slot, that opens proximate a bottom surface 74 of the floor 20 and the attachment device 46 and strap 50 are disposed under the floor 20 and are extendable toward a rear end 76 of the deck 18 using the adjustment device 48. This configuration of the pocket 28 is very advantageous because it enables the strap 50 to be directed around the rear end 76 of the deck and upwardly toward the cargo 17 at the angles described herein to provide the predetermined downward force (F) and the desired vertical force component ($F_V$).

Figure 2:
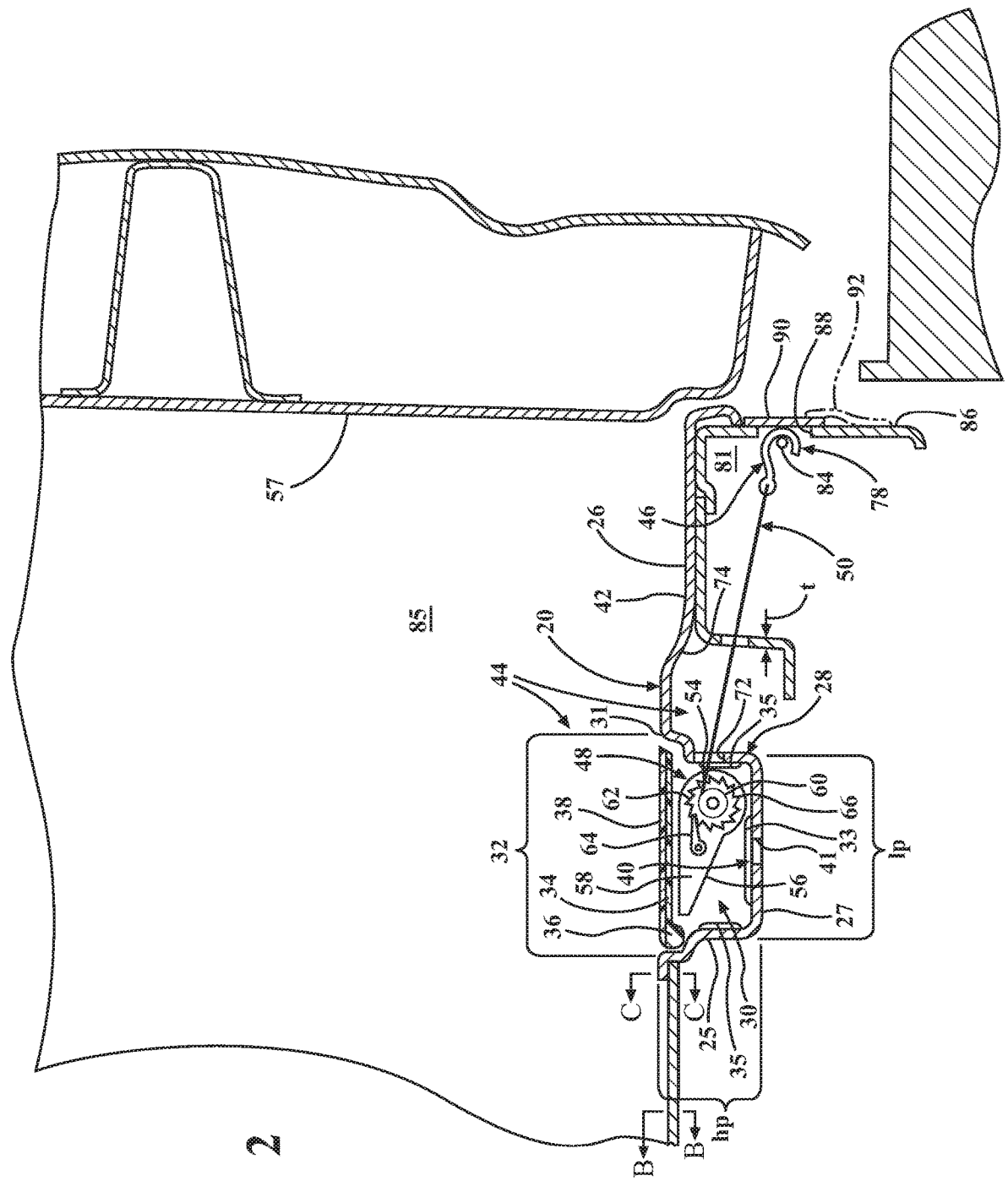
FIG. 2 is a view of the cross-section of FIG. 1A with the tie-down device of the tie-down device assembly in a stowed condition.
Figure 3:
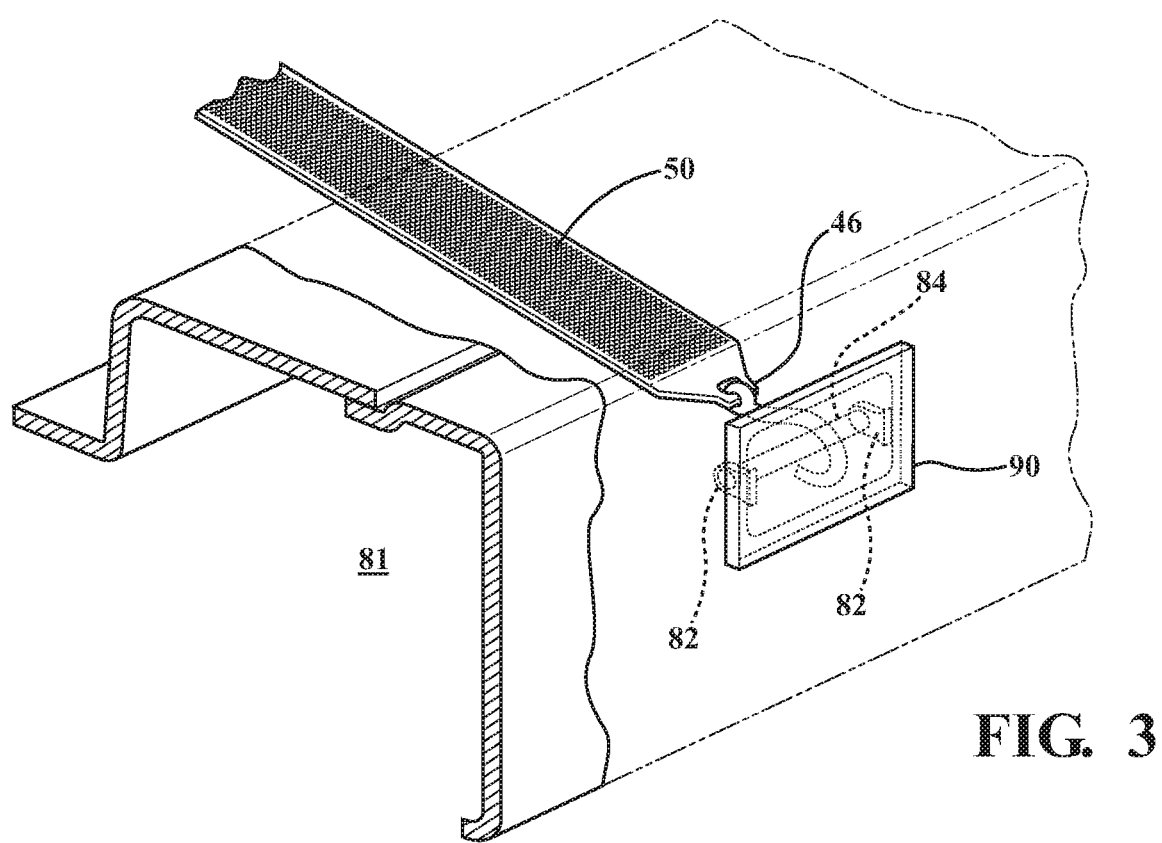
FIG. 3 is a perspective view of a portion of an alternate embodiment of a tie-down device assembly, particularly illustrating an alternate embodiment of an attachment point and attachment point cover.

In one embodiment, as shown in FIGS. 1-4, the under-floor truck deck tie-down device assembly 1, or assemblies, and/or rear compartment 14 of the truck 10 includes an attachment point 78 disposed on the bottom surface 74 of the floor 20. The bottom surface 74 is the lowermost surface of the floor 20. In one embodiment, the floor 20 comprises a single layer or ply of the floor material and the bottom surface is the side of the sheet opposite the top surface 26 as shown at section B-B in FIG. 1A. In embodiments where the floor 20 comprises a plurality of layers or plies of the floor material, the bottom surface 74 is the lowermost surface of the lowermost layer as illustrated generally at section C-C in FIG. 1A where adjoining single layer sections of floor 20 overlap. The attachment device 46 and strap 50 extend and may be attached to the attachment point 78 as illustrated in FIGS. 2 and 3, as examples. In one embodiment, the attachment device 46 and strap 50 extend and are attached to the attachment point 78 and may be tensioned by the adjustment device 48 in and define a stored or stowed condition 81 or position (see FIGS. 2 and 3). In one embodiment, the under-floor truck deck tie-down device assembly 1 (or assemblies), including the attachment device 46 and strap 50, are further extendable around the rear end 76 of the deck 18 upwardly to define a partially deployed condition 83 or position (see FIG. 4) in preparation, for example, for attachment to a cargo attachment located on a cargo 17 where they are configured to be attached and tightened and tensioned to exert the predetermined downward force (F) on the cargo 17 and define a deployed condition 85 or position (see FIG. 1A). Any suitable attachment point 78 may be used, including, in one embodiment, protruding arms 82 (FIG. 3) and handle 84 (FIGS. 1-4), which may be formed from any suitable material, including a metal or engineering plastic, or a combination thereof.

Figure 4:
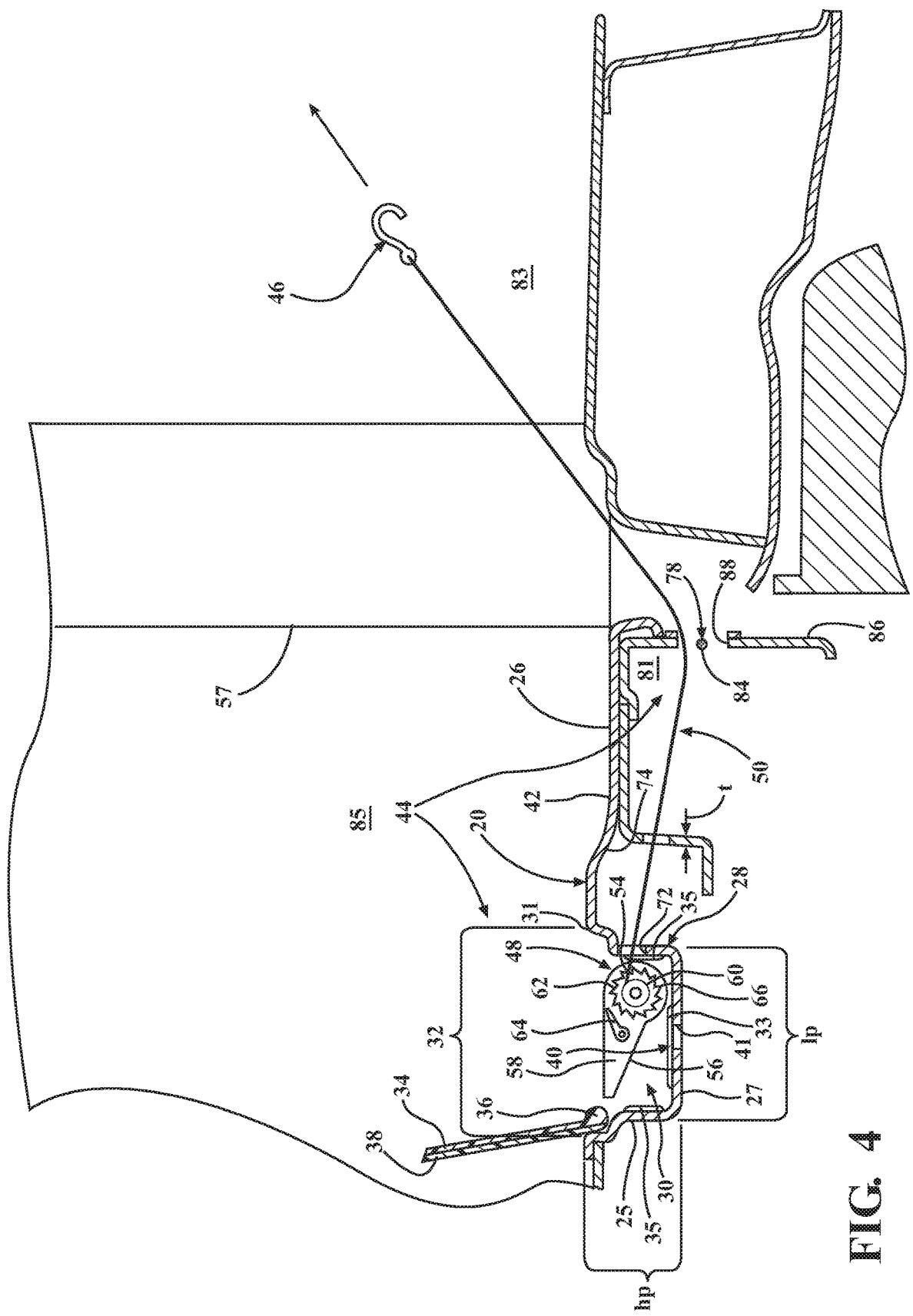
FIG. 4 is a view of the cross-section of FIG. 1A with the tie-down device of the tie-down device assembly in a partially deployed condition.

In one embodiment, as shown in FIGS. 1-2, and 4, the attachment point 78 includes the handle 84 and a pair of opposed protruding arms 82 (as illustrated in FIG. 3) attached to a member 86, such as a bracket member or vehicle frame member, disposed on the bottom surface 74 of the floor 20, and the member 86 includes an opening 88, such as a slot or channel, and a selectively removable attachment point cover 90 disposed in or over the opening 88 to cover the opening 88. By extension, in another similar embodiment, a plurality of the under-floor truck deck tie-down device assemblies 1 includes a corresponding plurality of attachment points 78, openings 88 in the same or other member 86 or members 86, and the attachment point covers 90 each have this configuration (i.e. the attachment point 78 attached to the member 86).

Alternately, in another embodiment, having the same configuration of components as shown in FIGS. 1-2, and 4 except for a different embodiment and configuration of the attachment point 78 and attachment point cover 90, the attachment point 78 includes the handle 84 and the pair of opposed protruding arms 82 (as illustrated in FIG. 3) attached to the attachment point cover 90 that when tensioned is selectively and removably attached by being pressed against the member 86, such as a bracket member or vehicle frame member, disposed on the lower surface 80 of the floor 20, wherein the member 86 includes an opening 88, such as a slot or channel, and a selectively removable attachment point 78 and attachment point cover 90, disposed in or over the opening 88 to cover the opening 88. By extension, in another similar embodiment, a plurality of the under-floor truck deck tie-down device assemblies 1 includes a corresponding plurality of attachment points 78, openings 88 in the same or other member 86 or members 86, and the attachment point covers 90 each have this configuration (i.e. the attachment point 78 attached to the attachment point cover 90).

In one embodiment, the plurality of openings 88 and attachment point covers 90 correspond to the number of pockets 28. The attachment device(s) 46 and strap(s) 50 may pass and be extended through the opening(s) 88 for positioning and used to achieve the conditions described herein. The attachment point cover 90, or attachment point covers 90, may be completely removable from the opening 88 and truck 10 (FIG. 1A), as well as optional arrangements where the attachment point cover 90 is partially removable and attached to the member 86, or the floor 20, such as by an optional tether 92 or other attachment device that allows removal of the attachment point cover 90 from the opening 88 but also retains the attachment point cover 90, including a strap, cord, or other flexible tether configuration.

The terms "a" and "an" herein do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity). Furthermore, unless otherwise limited all ranges disclosed herein are inclusive and combinable (e.g., ranges of "up to about 25 weight percent (wt. %), more particularly about 5 wt. % to about 20 wt. % and even more particularly about 10 wt. % to about 15 wt. %" are inclusive of the endpoints and all intermediate values of the ranges, e.g., "about 5 wt. % to about 25 wt. %, about 5 wt. % to about 15 wt. %", etc.). The use of "about" in conjunction with a listing of items is applied to all of the listed items, and in conjunction with a range to both endpoints of the range. Finally, unless defined otherwise, technical and scientific terms used herein have the same meaning as is commonly understood by one of skill in the art to which this invention belongs. The suffix "(s)" as used herein is intended to include both the singular and the plural of the term that it modifies, thereby including one or more of that term (e.g., the metal(s) includes one or more metals). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments.

It is to be understood that the use of "comprising" in conjunction with the components or elements described herein specifically discloses and includes the embodiments that "consist essentially of" the named components (i.e., contain the named components and no other components that significantly adversely affect the basic and novel features disclosed), and embodiments that "consist of" the named components (i.e., contain only the named components).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A deck for a truck, comprising:
a floor that defines a cargo area on a top surface;
a pocket disposed in the floor, the pocket defining a space disposed below the top surface of the floor, and comprising an opening that opens below a bottom surface of the floor; and
a tie-down device disposed in the pocket, the tie-down device comprising an attachment device, an adjustment device, and an elongated strap having an attachment end that is attached to the attachment device configured for attachment to a cargo and an adjustment end that is attached to the adjustment device, the attachment device and the strap extendable through the opening and below the bottom surface toward a rear end of the deck using the adjustment device, and the tie-down device configured to adjust the length of the strap and apply a downward tensioning force to the cargo.

2. The deck of claim 1, wherein the attachment device and strap extend and are attached to an attachment point disposed on a lower surface of the floor.

3. The deck of claim 2, wherein the attachment point is attached to a member disposed on the lower surface of the floor, and wherein the member comprises an opening and a selectively removable cover disposed in the opening.

4. The deck of claim 1, wherein the attachment device and strap are further extendable around the rear end of the deck upwardly to a cargo attachment.

5. The deck of claim 1, wherein the truck comprises a light-duty, medium-duty, or heavy-duty truck.

6. The deck of claim 5, wherein the light-duty truck comprises a pickup truck.

7. The deck of claim 1, wherein the pocket comprises a drain.

8. The deck of claim 1, wherein the pocket comprises a longitudinally-extending rib, a laterally-extending rib, or a combination thereof.

9. The deck of claim 1, wherein the attachment device comprises a loop in the strap, circular ring, D-ring, carabiner, link, threaded quick link, connecting link, clevis, coupling, or hook, or a combination thereof.

10. The deck of claim 1, wherein the adjustment device comprises a selectively releasable and engageable strap ratchet device.

11. The deck of claim 10, wherein the strap ratchet device comprises a rotatable ratchet handle, a spindle rotatably disposed within the handle that is attached to the adjustment end of the strap and to a selectively engageable and releasable ratchet mechanism, and wherein the strap ratchet device is configured to tension the strap by collection of the strap around the spindle by the engaged ratchet mechanism upon back and forth rotation of the handle, and to release the tension of the strap by release of the ratchet mechanism and spindle.

12. The deck of claim 1, wherein the deck comprises a selectively openable and closable pocket cover movable between an open position and a closed position, the pocket cover disposed to cover the pocket in the closed position.

13. The deck of claim 12, wherein the deck comprises a plurality of pockets and a corresponding plurality of pocket covers and tie-down devices.

14. The deck of claim 13, wherein the plurality of pockets is disposed in a spaced apart pattern within the floor.

15. The deck of claim 13, wherein the floor comprises a front portion and a rear portion, and wherein the plurality of pockets is disposed in the front portion and the rear portion.

16. The deck of claim 13, wherein the floor comprises a front portion and a rear portion, and wherein the plurality of pockets is disposed in the rear portion.

17. A tie-down device assembly for the deck of a pickup truck, comprising:
a pocket configured for disposition in the floor of a pickup truck deck, the pocket defining a space disposed below the floor, and comprising an opening that opens below a bottom surface of the floor; and
a tie-down device disposed in the pocket, the tie-down device comprising an attachment device, an adjustment device, and an elongated strap having an attachment end that is attached to the attachment device configured for attachment to a cargo and an adjustment end that is attached to the adjustment device, the attachment device and the strap extendable through the opening and below the bottom surface toward a rear end of the deck using the adjustment device, and the tie-down device configured to adjust the length of the strap and apply a downward tensioning force to the cargo.

18. A truck, comprising:
an enclosed passenger compartment; and
a rear compartment comprising a deck, the deck comprising:
a floor that defines a cargo area on a top surface;
a pocket disposed in the floor, the pocket defining a space disposed below the floor, and comprising an opening that opens below a bottom surface of the floor; and
a tie-down device disposed in the pocket, the tie-down device comprising an attachment device, an adjustment device, and an elongated strap having an attachment end that is attached to the attachment device configured for attachment to a cargo and an adjustment end that is attached to the adjustment device, the attachment device and the strap extendable through the opening and below the bottom surface toward a rear end of the deck using the adjustment device, and the tie-down device configured to adjust the length of the strap and apply a downward tensioning force to the cargo.

19. The truck of claim 18, wherein the deck comprises a selectively openable and closable pocket cover movable between an open position and a closed position, the pocket cover disposed to cover the pocket in the closed position.

20. The truck of claim 19, wherein the deck comprises a plurality of pockets and a corresponding plurality of pocket covers and tie-down devices.

\* \* \* \* \*